United States Patent Office 2,989,971
Patented June 27, 1961

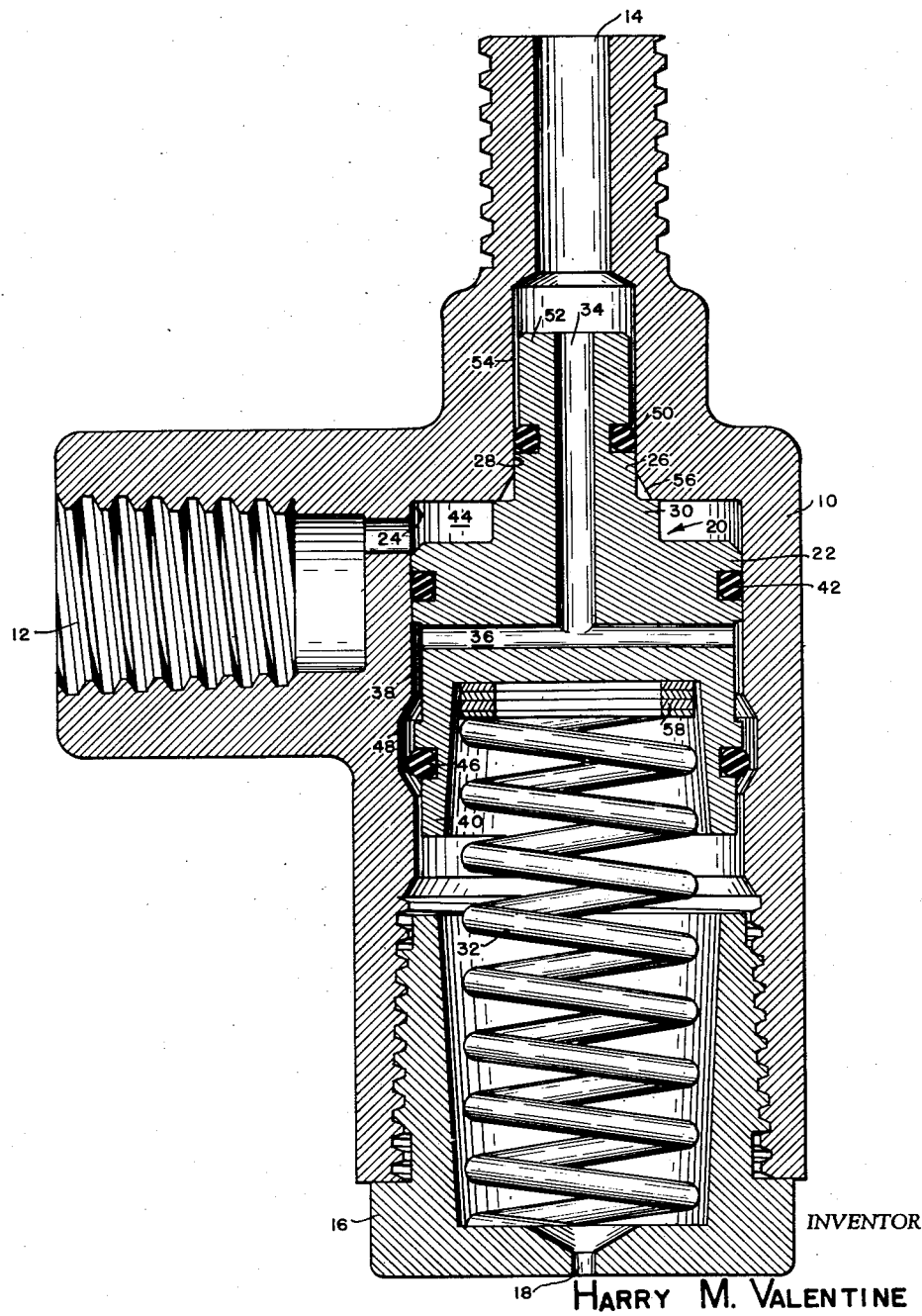

2,989,971
TRIPPER VALVE
Harry M. Valentine, Elyria, Ohio, assignor to Bendix-Westinghouse Automotive Air Brake Company, Elyria, Ohio, a corporation of Delaware
Filed Feb. 4, 1957, Ser. No. 638,155
15 Claims. (Cl. 137—102)

This invention relates to a fluid pressure valve mechanism and more particularly to a valve device for controlling the flow of fluid under pressure and which functions in accordance with variations in the magnitude of the fluid pressure.

One of the objects of the present invention is to provide a novel fluid pressure valve which may be advantageously utilized in installations requiring a governing action which takes place at different control pressures.

Another object of the invention is to provide a simplified type of governor or tripper valve which is positive in operation at the desired cut-in and cut-out pressures and which includes relatively few parts.

A further object is to provide in a valve of the above character, a novel valve structure including resilient rings of the O type which function not only as fluid pressure seals, but also as valve devices for controlling the flow of fluid under pressure.

Another object is to arrange the O rings in such a manner, in a valve device of the foregoing type, that the rings are securely maintained in position so that there will be no tendency for such rings to be dislodged from their seats during operation.

Other objects and novel features of the invention will appear more fully hereinafter from a consideration of the following detailed description when taken in connection with the accompanying drawing wherein one embodiment of the invention is illustrated. It is to be expressly understood, however, that the drawing is utilized for purposes of illustration only and is not to be taken as a definition of the limits of the invention, reference being had for this purpose to the appended claims.

In the drawing, the single figure is a sectional view of a fluid pressure valve constructed in accordance with the principles of the present invention. Therein, the novel valve includes a casing 10 having a reservoir or inlet connection 12, a control or outlet connection 14 and a cap 16 having an atmospheric connection 18. In cases where the valve is to be used as a governor for a compressor unloader, the connection 12 may be connected to a reservoir and the connection 14 may lead to a compressor unloading mechanism. The reservoir and unloader may be of any conventional form such as that shown, for example, in the patent to B. S. Aikman, No. 1,754,218, dated April 15, 1930. The valve of the invention may also be advantageously employed in connection with the control of a tractor protection valve in an automotive air brake safety system of the general type shown, for example, in the patent to E. R. Fitch and T. J. Turek, No. 2,645,308, dated July 14, 1953, and in such event, the present valve replaces the governor 124 of that patent. Other uses for the invention will be readily apparent from the description which follows.

In order to control the flow of fluid under pressure, which in the present instance is compressed air, the casing 10 houses a pressure responsive valve element 20 which includes a piston 22, slidable within a large bore 24, and a second piston 26 which is slidable within a small bore 28. As shown, the pistons 22 and 26 are connected by a stepped portion 30 which is normally engaged with a portion of the casing 10 through the action of a spring 32, confined between the piston 22 and the cap 16. In this position of the valve element, the outlet connection 14 and the atmospheric connection 18 are connected by way of interconnected bores 34 and 36 in the pistons, together with exhaust passage 38, it being noted that the piston 22 is provided with a skirt or depending portion 40 which is spaced from the wall of the bore 24 to define an annular exhaust passage 38. It will also be observed that in the normal position illustrated, the top of piston 22 surrounding the stepped portion 30 is constantly subjected to the pressure at the inlet connection 12. Preferably, the piston 22 is provided with a resilient sealing device such as the O ring 42 for sealing communication between the inlet chamber 44, above the piston, and the exhaust chamber 38.

Novel valve means are associated with the valve element 20 for controlling the fluid pressure flow as the valve element is moved within the casing 10, and in the form of the invention illustrated, such valve means include resilient valve rings of rubber or rubbery material of the O type. More particularly, the skirt 40 of the piston 22 is provided with a suitable groove for receiving a resilient O ring 46 which is positioned opposite an enlargement 48 of the exhaust chamber 38 and which functions as an exhaust valve in a manner which will appear more fully hereinafter. The inlet valve is constituted by a resilient O ring 50 which is contained within a suitable groove in the piston 26 and in the normal position illustrated, the inlet valve 50 engages the bore 28 and prevents communication between the inlet chamber 44 and the outlet connection 14. As shown, the piston 26 is provided with an extension 52 which is slightly smaller than the bore 28 in order to provide a clearance 54 which communicates at all times with the outlet connection 14.

In operation, as the pressure at the inlet or reservoir connection 12 is increased, such pressure acts upon the area of the piston 22, which is exposed in the chamber 44, to move the valve element 20 downwardly, when the force on the top of the piston slightly exceeds the preloaded force of the spring 32. Continued downward movement of the valve element 20 first causes the O ring 46 to enter and contact the bore 24 immediately below the enlargement 48, thus closing communication between the control or outlet connection 14 and the atmospheric connection 18 via bores 34 and 36, exhaust passage 38 and the enlargement 48. Further increase of pressure in the inlet chamber 44 effects further downward movement of the valve element 20 to a point where the O ring 50 leaves the bore 28 whereupon compressed air flows from the inlet chamber to the control connection 14 by way of clearance 54. Simultaneously with the build-up of pressure at the connection 14, an additional downward force on the piston 22 ressults due to the fluid pressure which acts on the area of the piston 26. This additional force causes a snap action which forces the valve element 20 downwardly where the bottom of the skirt 40 engages the inner end of the cap 16.

It will be readily understood that as the pressure in the inlet chamber drops, the valve element 20 will start to move upwardly at some predetermined pressure and the inlet valve O ring 50 will start to enter the bore 28. In order to facilitate such entry, the lower portion of such bore is outwardly flared at 56. As the O ring 50 engages the bore 28, communication between the inlet chamber 44 and the outlet connection 14 will be interrupted and thereafter, the exhaust valve O-ring 46 will emerge into the enlargement 48. When this occurs, the valve element 20 will be returned to the normal position shown with a snap action, this being due to the sudden connection between the outlet connection 14 and the atmospheric connection 18 and the resultant loss of pressure on the area of the piston 26 within the bore 28. This snap action is important in a valve of this character since it is desirable to have full open or full closed positions without creep or hesitation.

In certain installations of the valve of the present invention, it may be desirable that a 50 p.s.i. pressure in the inlet chamber will cause the inlet valve O-ring 50 to leave the bore 28 and thus connect the inlet connection 12 with the control connection 14. Due to the differential areas of the pistons 22 and 26, it will be readily apparent that a lesser pressure will be required to cause complete re-entry of the O-ring 50 into the bore 28, as for example, 40 p.s.i. Hence, with the valve of the present invention, the cut-in and cut-out pressures will be different and by the use of springs of different characteristics as well as by the use of shims 58, these pressures may be readily varied.

From the foregoing, it will be readily perceived that the present invention provides a novel valve device which functions positively in accordance with variations in the magnitude of the control pressure. The construction is relatively simple but reliable in operation. The use of the O-rings 46 and 50 respectively carried by the piston elements 22 and 26 materially contributes to the simplicity of the construction, inasmuch as these rings not only function as valves in controlling the flow of fluid pressure, but also function as air seals in preventing leakage of compressed air, once the valves are closed. In addition, the O-rings 46 and 50 are positioned so as to be downstream of the air flow. This feature prevents them from being dislodged from their grooves and also tends to ease and facilitate their entry into their respective bores.

Although a specific embodiment of the invention has been illustrated and described herein, it will be readily understood by those skilled in the art that various changes may be resorted to without departing from the spirit of the invention. Reference will therefore be had to the appended claims for a definition of the limits of the invention.

What is claimed is:

1. A fluid pressure valve having a casing provided with a resrevoir connection, a control connection and an atmospheric connection, valve means normally occupying a first position to establish communication between the control connection and the atmospheric connection and movable to a second position to first interrupt said communication and thereafter establish communication between the control connection and the reservoir connection, a spring for normally maintaining the valve means in said first position, and means for operating said valve means comprising a pair of rigidly connected pressure responsive members connected with said valve means, means for constantly subjecting one only of said members to the pressure of the fluid at the reservoir connection, and means for subjecting the other member to the pressure of the fluid at the reservoir connection only after movement of said valve means to establish communication between the control connection and the reservoir connection, said valve means including a pair of separate resilient rings respectively surrounding and carried by said pressure responsive members.

2. A fluid pressure valve as set forth in claim 1 wherein the pressure responsive members are of different effective areas.

3. A fluid pressure valve as set forth in claim 2 wherein the pressure responsive member having the larger effective area is constantly subjected to the pressure of the fluid at the reservoir connection.

4. A fluid pressure valve having a casing provided with a reservoir connection, a control connection and an atmospheric connection, valve means normally occupying a first position to establish communication between the control connection and the atmospheric connection and initially movable to a second position to first interrupt said communication and thereafter movable to a third position in which said communication remains interrupted and communication is established between the control connection and the reservoir connection, a spring for normally maintaining the valve means in said first position, means including a first pressure responsive element constantly subjected to the fluid pressure at the reservoir connection for moving said valve means to said second position, and means for suddenly moving said valve means to said third position comprising a second pressure responsive element rigidly connected with said first pressure responsive element, said pressure responsive elements being connected with said valve means, and means to subject the second pressure responsive element to the fluid pressure at the reservoir connection when said valve means is moved to said second position, said valve means including a pair of separate resilient rings respectively surrounding and carried by said pressure responsive elements.

5. A fluid pressure valve as set forth in claim 4 wherein the pressure responsive elements are of different effective areas.

6. A fluid pressure valve as set forth in claim 5 wherein the first pressure responsive element has the larger effective area.

7. A fluid pressure valve as set forth in claim 5 wherein the second pressure responsive element is the smaller and comprises a piston having a pair of integral portions, one of which is slidable within the casing and the other of which is spaced from the casing, the said portions being separated by one of said resilient valve rings.

8. A fluid pressure valve having a casing provided with a large bore and a small bore, a reservoir connection communicating with said large bore, a control connection communicating with said small bore and an atmospheric connection communicating with said large bore, a valve element within the casing having a first pressure responsive portion slidable in the large bore and constantly subjected to the pressure at said reservoir connection, and a second pressure responsive portion slidable in the small bore, said element and said large bore of the casing having communicating passages for connecting said control connection with the atmospheric connection, a spring for normally maintaining said element in a position to connect said control and atmospheric connections, a resilient valve ring carried by said first portion and movable therewith in response to the pressure at the reservoir connection for interrupting communication between the control and atmospheric connections through said passages, and a second resilient valve ring carried by said second portion and movable therewith for thereafter connecting said reservoir and control connections and for subjecting said second portion to the pressure at the reservoir connection.

9. A fluid pressure valve as set forth in claim 8 wherein the first pressure responsive portion is provided with a part slidably engaging the large bore and a part spaced from said large bore.

10. A fluid pressure valve as set forth in claim 9 wherein the passage in the large bore comprises an enlargement adjacent the resilient valve ring carried by said first portion.

11. A fluid pressure valve as set forth in claim 8 wherein the second pressure responsive element is provided with a part slidably engaging the small bore and a part spaced from said small bore.

12. A fluid pressure valve as set forth in claim 11 wherein the parts of the second pressure responsive element are separated by said second resilient valve ring.

13. A fluid pressure valve having a casing provided with a large bore and a small bore, a reservoir connection communicating with said large bore, a control connection communicating with said small bore and an atmospheric connection communicating with said large bore, a valve element slidably mounted within the casing having a first portion slidably engaging the large bore and constantly subjected to the pressure at said reservoir connection, said first portion having an extension spaced from said large bore, said valve element also having a second portion slidably engaging the small bore and an extension integral with the second portion and being spaced from said small bore, means including communicating passages in said element and said large bore for normally connecting said control and atmospheric connections, a spring for normally maintaining said element in a position to connect said control and atmospheric connections, a resilient valve ring carried by the first named extension and cooperating with said large bore to interrupt communication between the control and atmospheric connections through said passages during movement of said element in response to pressure at said reservoir connection, and a second resilient valve ring carried by the second named portion for normally sealing communication between the reservoir connection and the control connection and movable out of said small bore into said large bore during continued movement of said element to thereafter connect said reservoir and control connections and subject said second named portion to the pressure at said reservoir connection.

14. A fluid pressure valve as set forth in claim 13 wherein the passage in the large bore comprises an enlargement adjacent the valve ring carried by the first named extension.

15. A fluid pressure valve having a casing provided with a large bore and a small bore, an inlet connection and an atmospheric connection communicating with the large bore, an outlet connection communicating with the small bore, and a valve element slidably mounted in the casing for controlling communication between said connections, comprising a pressure responsive piston slidably engaging the large bore and subjected at all times to the pressure at said inlet connection, said piston having a resilient sealing ring for preventing leakage of pressure from one side to the other, a skirt integral with said piston and spaced from the wall of the large bore to provide an exhaust passage normally communicating with said atmospheric connection, a second pressure responsive piston connected with the first piston and slidably engaging the small bore, said second piston having a skirt spaced from the wall of the small bore to provide a clearance communicating at all times with the outlet connection, said valve element having a passage for connecting at all times the outlet opening and said exhaust passage, a resilient valve ring surrounding and carried by the skirt of the first piston and movable therewith in response to pressure at the inlet connection to engage the large bore and interrupt communication between the exhaust passage and the atmospheric connection, and a second resilient valve ring surrounding and carried by the second piston and normally engaging the small bore to seal communication between the inlet connection and said clearance and subject the second piston to the pressure at the inlet connection during continued movement of the valve element after said interruption of communication between said exhaust passage and the atmospheric connection.

References Cited in the file of this patent

UNITED STATES PATENTS

| | | |
|---|---|---|
| 1,726,102 | Forman | Aug. 27, 1929 |
| 2,488,949 | Walsh | Nov. 22, 1949 |
| 2,680,447 | Groves | June 8, 1954 |
| 2,764,174 | Wilson | Sept. 25, 1956 |
| 2,860,662 | Gres | Nov. 18, 1958 |

FOREIGN PATENTS

| | | |
|---|---|---|
| 707,165 | Great Britain | Apr. 14, 1954 |